(12) United States Patent
Derivaz

(10) Patent No.: US 8,869,404 B2
(45) Date of Patent: Oct. 28, 2014

(54) WOOD CHISEL AND BLADE FOR A WOOD CHISEL

(75) Inventor: Francois Derivaz, Chantel-St-Denis (CH)

(73) Assignee: Samvaz S.A., Chatel-St-Denis (CH)

( * ) Notice: Subject to any disclaimer, the term of this patent is extended or adjusted under 35 U.S.C. 154(b) by 504 days.

(21) Appl. No.: 13/071,805

(22) Filed: Mar. 25, 2011

(65) Prior Publication Data

US 2011/0247218 A1    Oct. 13, 2011

(30) Foreign Application Priority Data

Apr. 8, 2010  (EP) ................................... 10003752

(51) Int. Cl.
*B25D 3/00*  (2006.01)
*B26B 5/00*  (2006.01)

(52) U.S. Cl.
USPC .............................................. 30/167; 30/296.1

(58) Field of Classification Search
CPC .............. B25G 1/10; B25G 1/00; B25G 3/00; B26B 5/00
USPC .......................... 30/160, 161, 164, 167, 292.1
See application file for complete search history.

(56) References Cited

U.S. PATENT DOCUMENTS

| 404,554 | A | * | 6/1889 | Palmer | 30/167 |
|---|---|---|---|---|---|
| 447,776 | A | * | 3/1891 | Islin | 81/487 |
| 903,093 | A | * | 11/1908 | Howe | 30/167 |
| 940,478 | A | * | 11/1909 | Rewalt | 30/277 |
| 1,082,802 | A | * | 12/1913 | Pull | 30/315 |
| 1,092,447 | A | * | 4/1914 | Leland | 30/167 |
| 1,334,686 | A | * | 3/1920 | Whyte | 30/167 |
| 1,442,084 | A | * | 1/1923 | Miner | 76/119 |
| 1,471,461 | A | * | 10/1923 | Harmon | 30/168 |
| 1,603,771 | A | * | 10/1926 | Hokanson | 30/167 |
| 2,053,707 | A | * | 9/1936 | Farmer | 206/349 |
| 2,291,514 | A | * | 7/1942 | Warner et al. | 30/162 |
| 2,565,193 | A | * | 8/1951 | Aubin | 30/492 |
| 4,821,419 | A | * | 4/1989 | Lee | 30/493 |
| 6,226,873 | B1 | * | 5/2001 | Okumura | 30/162 |
| 6,510,612 | B1 | * | 1/2003 | Cybulski | 30/162 |
| 6,629,985 | B1 | * | 10/2003 | Kiehne | 606/167 |
| 6,769,147 | B1 | * | 8/2004 | Stubbs | 7/105 |
| 6,813,833 | B2 | * | 11/2004 | Saunders et al. | 30/162 |
| 6,898,855 | B2 | * | 5/2005 | Jones et al. | 30/169 |
| 6,966,113 | B2 | * | 11/2005 | Fossella | 30/162 |
| 7,257,896 | B2 | * | 8/2007 | Kurtz | 30/167 |
| 8,141,255 | B2 | * | 3/2012 | Su | 30/167 |

(Continued)

FOREIGN PATENT DOCUMENTS

| GB | 295832 A | 8/1928 |
|---|---|---|
| GB | 1586984 A | 3/1981 |
| WO | 98/21013 A1 | 5/1998 |

OTHER PUBLICATIONS

European Search Report, dated Sep. 7, 2010, in EP 10003752.

*Primary Examiner* — Sean Michalski
(74) *Attorney, Agent, or Firm* — Young & Thompson

(57) ABSTRACT

A tool, in particular a wood chisel, includes a first profiled part (100; 1), a second profiled part (103; 10, 14) and a removable blade (106; 20). The second profiled part (103; 10, 14) is pushed into the first profiled part such that the removable blade can be inserted between the first and second profiled parts (100; 1; 103; 10, 14) and be held therein by friction.

12 Claims, 7 Drawing Sheets

(56) References Cited

U.S. PATENT DOCUMENTS

| | | | |
|---|---|---|---|
| 8,443,522 B2* | 5/2013 | Jennings et al. | 30/162 |
| 2004/0103542 A1* | 6/2004 | Jones et al. | 30/169 |
| 2005/0243553 A1* | 11/2005 | Picone | 362/253 |
| 2008/0189957 A1* | 8/2008 | Kasper | 30/167 |
| 2008/0244913 A1* | 10/2008 | Lin | 30/167 |
| 2011/0041346 A1* | 2/2011 | Chen | 30/167 |
| 2012/0036721 A1* | 2/2012 | McHenry et al. | 30/162 |
| 2012/0222525 A1* | 9/2012 | Qiu | 81/489 |

* cited by examiner

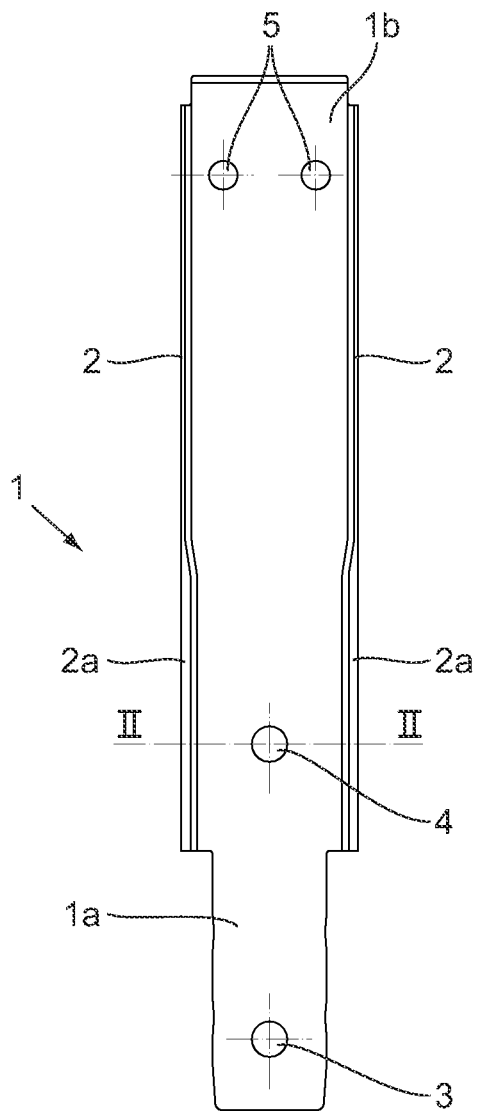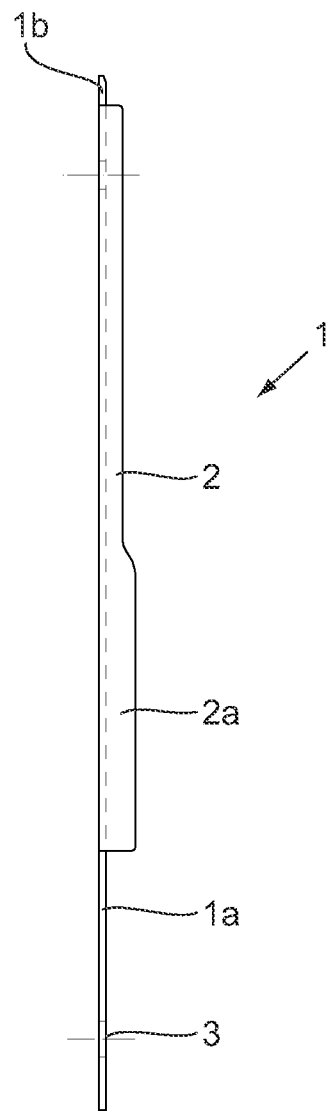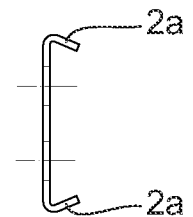

Fig.7
Fig.8
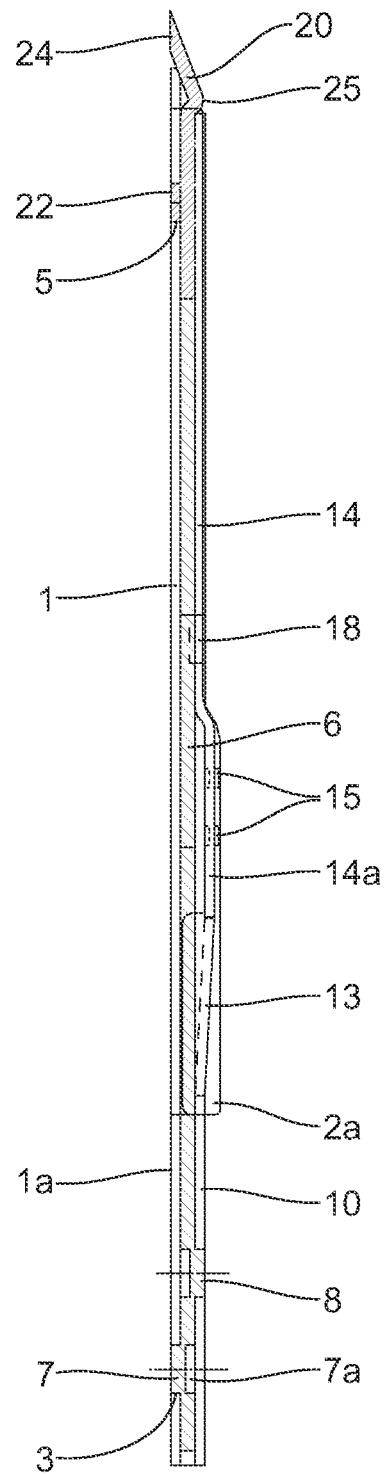
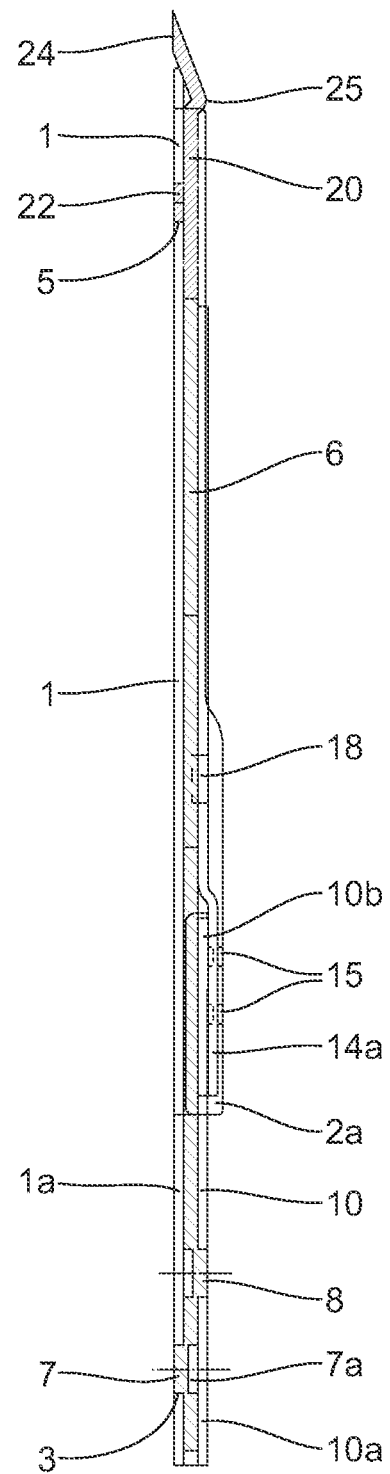

WOOD CHISEL AND BLADE FOR A WOOD CHISEL

BACKGROUND OF THE INVENTION

1. Field of the Invention

The present invention relates to a tool with a removable blade, in particular a wood chisel and a blade for such a tool.

2. Description of the Related Art

Wood chisels in which the blade is immovable are known. There are also wood chisels comprising a removable blade which can thus be changed in the case of pronounced wear or for varying the types of blade. However, these tools with a removable blade often require the use of a tool for detaching and mounting the blade.

SUMMARY OF THE INVENTION

The aim of the present invention is to provide a tool, in particular a wood chisel, in which the blade is removable and which permits simple and quick changing of the blade without the need for an auxiliary tool for mounting or detaching the blade, whilst guaranteeing that the blade is securely held once it is fixed to said tool. The aim of the present invention is also to provide a removable blade intended to be fitted to a tool, in particular a wood chisel.

The present invention relates to a tool, in particular a wood chisel, comprising a first profiled part, a second profiled part and a removable blade, characterised in that the second profiled part is pushed into the first profiled part such that the removable blade can be inserted between said first and second profiled parts and be held therein by friction.

The present invention also relates to a removable blade intended to be fitted to a tool, in particular a wood chisel, in accordance with the invention.

BRIEF DESCRIPTION OF THE DRAWING FIGURES

The accompanying drawings schematically illustrate by way of example several embodiments of a tool, in particular a wood chisel, with a removable blade, as well as said removable blade in accordance with the invention.

FIG. 1a is a view of the partially assembled elements forming said wood chisel,

FIG. 1b is a view of the fully assembled elements forming said wood chisel.

FIGS. 2a, 2b and 2c illustrate the first profiled part of a wood chisel in accordance with a second embodiment of the invention:

FIG. 2a is a top view of said first profiled part,

FIG. 2b is a side view of said first profiled part,

FIG. 2c is a cross-sectional view taken along the axis II-II of the first profiled part illustrated in FIG. 2a.

FIG. 3a is a top view of said core,

FIG. 3b is a side view of said core.

FIG. 4a is a top view of said locking element,

FIG. 4b is a side view of said locking element,

FIG. 4c is a cross-sectional view taken along the axis IV-IV of the locking element illustrated in FIG. 4a.

FIG. 5a is a top view of said sliding element,

FIG. 5b is a side view of said sliding element.

FIG. 6b is a profile view of the blade illustrated in FIG. 6a.

FIG. 7 illustrates a wood chisel in accordance with the second embodiment of the invention wherein the sliding element is in a first closed position.

FIG. 8 illustrates a wood chisel in accordance with the second embodiment of the invention wherein the sliding element is in a second open position.

DETAILED DESCRIPTION OF THE INVENTION

Figure 1A:
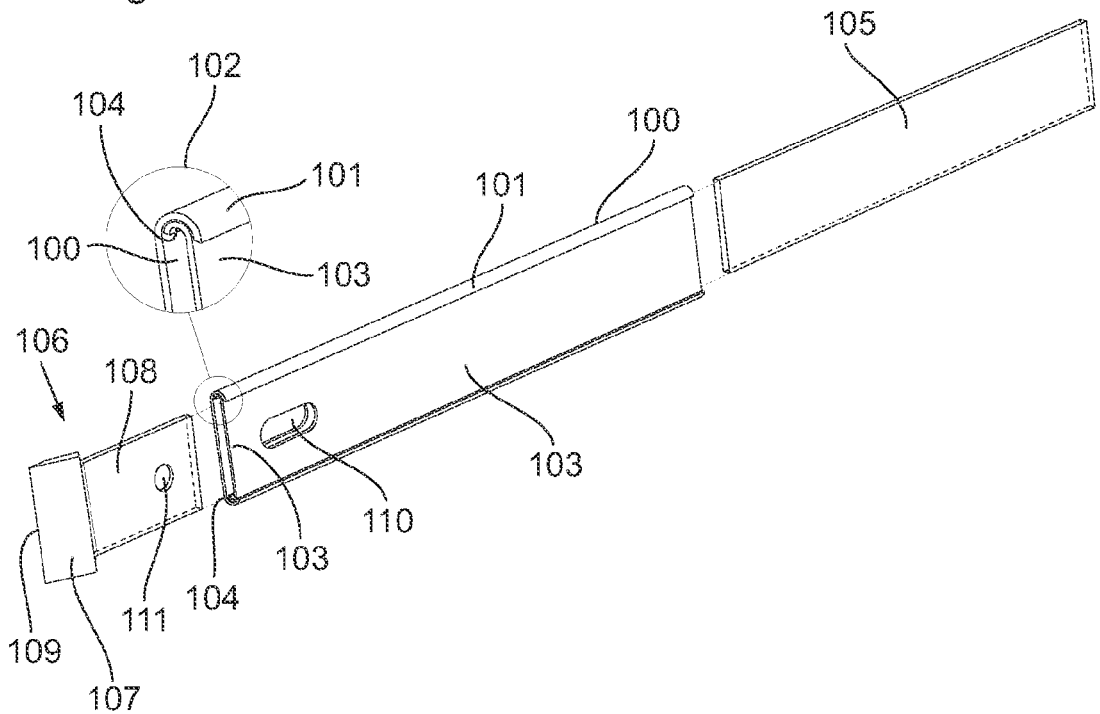
FIGS. 1a and 1b illustrate a wood chisel in accordance with a first embodiment of the invention.
Figure 1B:
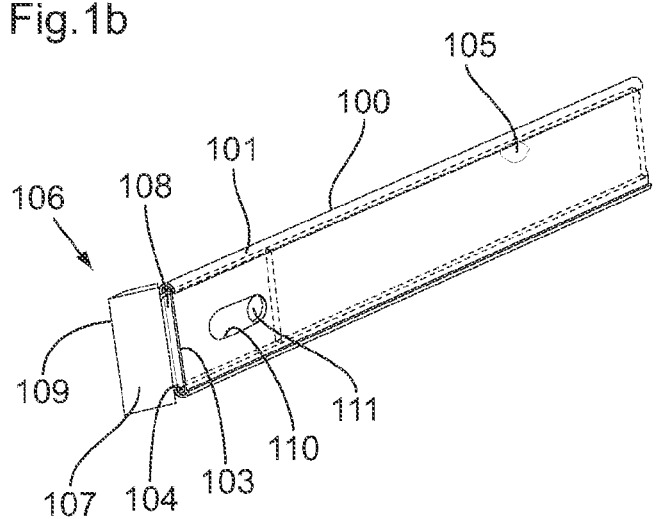

In the first embodiment illustrated in FIGS. 1a and 1b, the tool with a removable blade in accordance with the invention is a wood chisel. Said wood chisel comprises a first profiled part 100 having the form of a substantially rectangular plate whose edges 101 are curved as illustrated in the enlargement 102 of FIG. 1a.

In accordance with this first embodiment, the wood chisel in accordance with the invention further comprises a second profiled part 103 having the form of a substantially rectangular plate whose edges 104 are curved as illustrated in the enlargement 102 of FIG. 1a. The second profiled part 103 is shaped so as to be able to be inserted into the first profiled part 100 and its length is substantially equal to that of the first profiled part 100.

Preferably, the wood chisel in accordance with the invention further has a core 105 having the form of a substantially rectangular plate and intended to be inserted between the first and second profiled parts 100, 103. The core 105 is used to reinforce the wood chisel in accordance with the invention, thereby improving the rigidity of the tool.

The wood chisel in accordance with the invention further has a removable blade 106 formed from a cutting plate 107 fixedly attached to a fixing plate 108. The cutting plate 107 has at its free end a cutting edge 109. The size and shape of the fixing plate 108 are such that it can be forcibly inserted between the first and second profiled parts, thereby fixing the removable blade to the wood chisel in accordance with the invention. The size of the cutting plate and the angle of the cutting edge may vary depending upon the type of blade.

Preferably, the core is substantially shorter than the first and second profiled parts 100, 103, as illustrated in FIG. 1b, in order to permit the insertion of the fixing plate 108 of the removable blade 106 between the first and second profiled parts 100, 103.

In order to remove the removable blade 106, it only has to be pulled by the cutting plate out of the first and second profiled parts. Preferably, the first and second profiled parts each comprise a first oblong opening 110 at their end receiving the removable blade. The removable blade 106 for its part comprises a hole 111 in the fixing plate 108. The first oblong openings 110 and the hole 111 are such that when the removable blade 106 is inserted between the first and second profiled parts 100, 103 the hole 111 is visible through the oblong openings 110 as illustrated in FIG. 1b. This enables in particular the removable blade 106 to be easily removed from the wood chisel.

In the second embodiment illustrated in FIGS. 2 to 8, the tool with a removable blade in accordance with the invention is likewise a wood chisel. As in the first embodiment, said wood chisel comprises a first profiled part 1 illustrated in FIG.

2a and having the form of a substantially rectangular plate. A first end 1a of the first profiled part 1 is shaped to be able to be inserted and held in a handle (not shown) of the wood chisel.

As illustrated in FIGS. 2a and 2c, the first profiled part 1 has curved edges 2 along its entire length, except for at its first end 1a.

The first profiled part 1 further comprises different openings whose function will be described hereinafter. A first hole 3 is produced in the first profiled part 1 at its first end 1a. The first profiled part 1 further comprises a second hole 4 located between its curved edges 2. Finally, the first profiled part 1 further has two positioning holes 5 at its second end 1b.

Figure 3A:
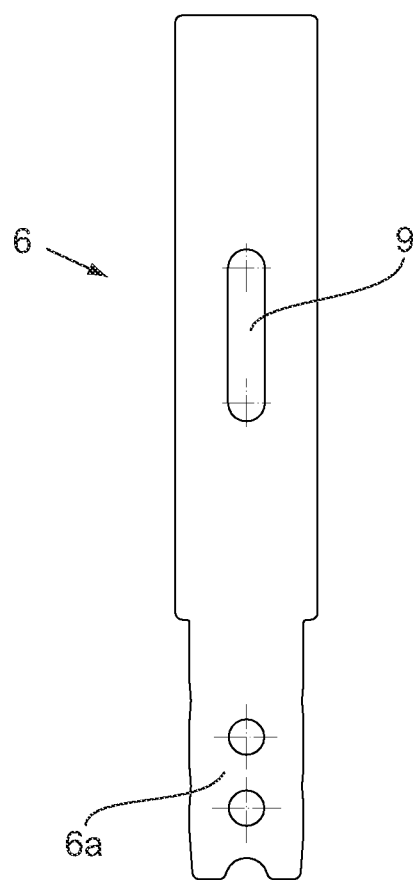
FIGS. 3a and 3b illustrate the core of a wood chisel in accordance with the second embodiment of the invention.

The wood chisel in accordance with the second embodiment of the invention comprises a core 6 illustrated in FIG. 3a and having the form of a substantially rectangular plate. The core 6 is shaped so as to be able to be slid between the curved edges 2 of the first profiled part 1. The core 6 likewise has an end 6a matched in terms of size and shape to the first end 1a of the first profiled part 1 and intended to be inserted and held in the handle of the wood chisel. The core 6 is used to reinforce the wood chisel in accordance with the invention.

Figure 3B:
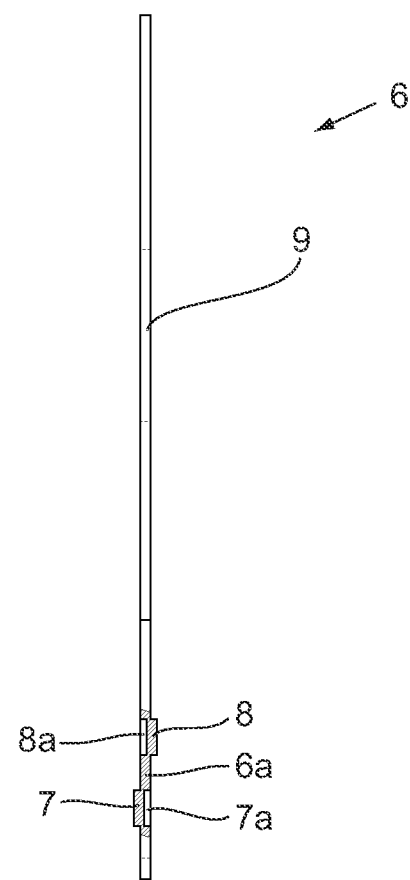

At its end 6a on a first face, the core 6 comprises a first protuberance 7 intended to co-operate with the first hole 3 of the first profiled part 1 to guarantee that the core 6 is suitably positioned and held with respect to the first profiled part 1. The core 6 further comprises, still at its end 6a, a second protuberance 8. As illustrated in FIG. 3b, this second protuberance 8 is located on the second face (opposite the first face) of the core 6 and is thus directed in a direction opposite that of the first protuberance 7. Moreover, still with reference to FIG. 3b, the core 6 has first and second recesses 7a, 8a corresponding to the first and second protuberances 7, 8 respectively. The first recess 7a and the second protuberance 8 are located on the same second face of the core 6. Similarly, the second recess 8a and the first protuberance 7 are located on the same face of the core, opposite the second face.

The core 6 further has an oblong opening 9 extending in parallel with the longer sides of said core 6.

In this second embodiment, the second profiled part is composed of two elements: a locking element 10 and a sliding element 14.

Figure 4A:
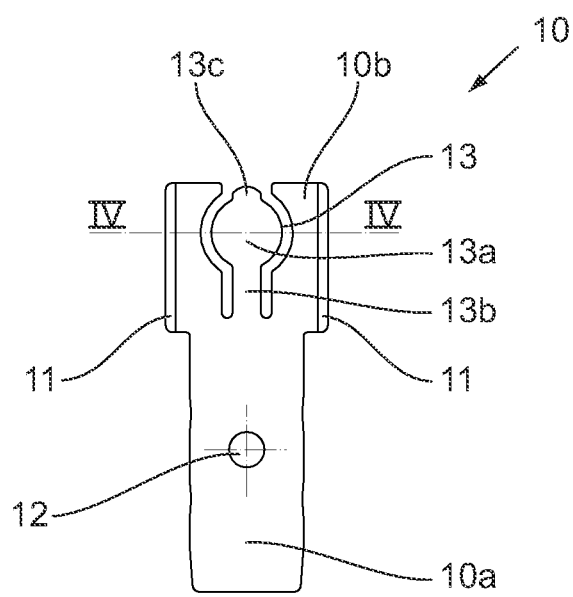
FIGS. 4a, 4b and 4c illustrate the locking element of a wood chisel in accordance with the second embodiment of the invention.
Figure 4B:
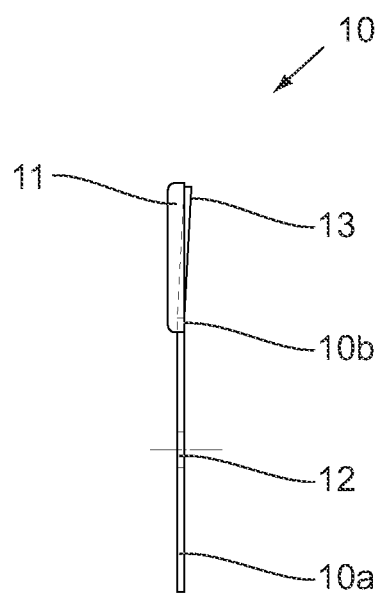
Figure 4C:
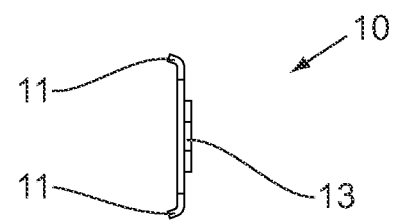

The locking element 10 illustrated in FIG. 4a has a substantially rectangular shape. The locking element 10 comprises a first portion 10a matched in terms of size and shape to the first end 1a of the first profiled part 1 and to the first end 6a of the core 6 and likewise intended to be inserted and held in the handle of the wood chisel. The second portion 10b of the locking element 10 comprises lateral flanges 11 illustrated in FIGS. 4b and 4c. The second portion 10b and the lateral flanges 11 are shaped such that the locking element 10 can be inserted into the first profiled part 1 and that the core 6 is held between said first profiled part 1 and the locking element 10 by the combined insertion effect of the bent edges 2 of the first profiled part 1 and the lateral flanges 11.

Moreover, the locking element 10 comprises on its first portion 10a a third hole 12 intended to co-operate with the second protuberance 8 of the core 6 so as to guarantee that the locking element 10 is suitably positioned with respect to the core 6.

The locking element 10 further comprises a tab 13 cut from its second portion 10b. Said tab 13 is shaped so as to have a certain degree of resiliency under pressure along an axis perpendicular to the longitudinal axis of the locking element 10. Preferably, the tab 13 has a substantially circular portion 13a providing a suitable pressing area for the user, fixedly attached to the locking element 10 by an arm 13b. In a likewise preferable manner, the tab 13 has on its free end a finger 13c whose function will be described hereinafter.

Figure 5A:
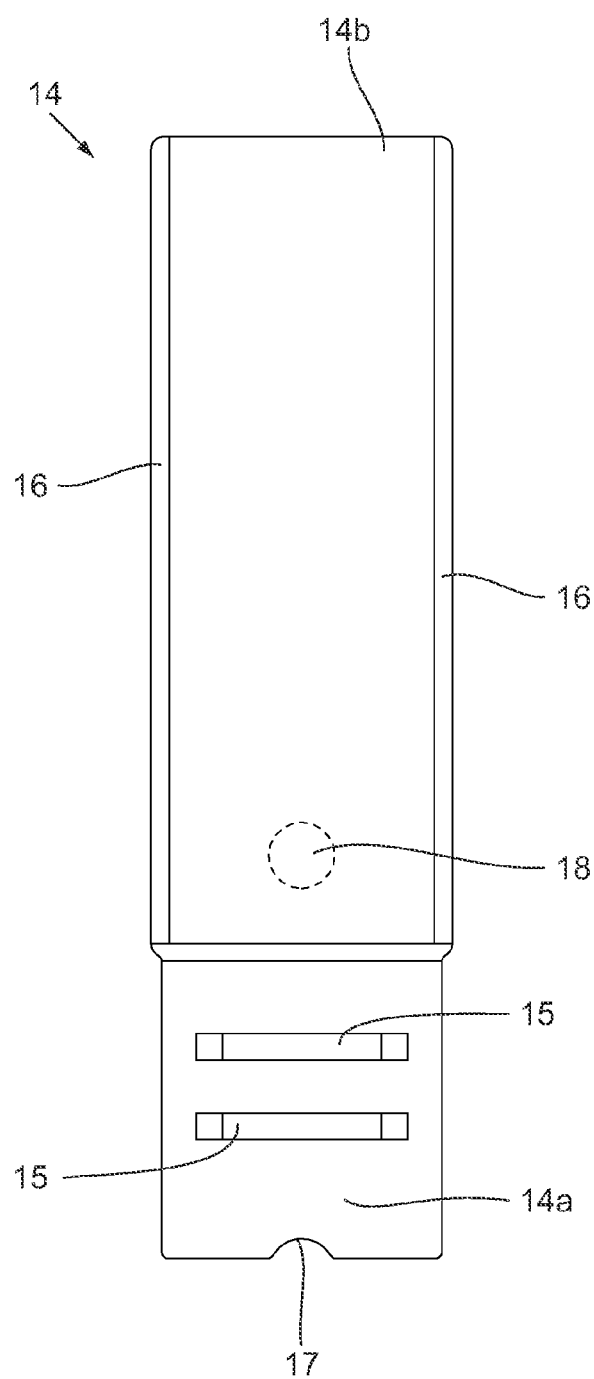
FIGS. 5a and 5b illustrate the sliding element of a wood chisel in accordance with the second embodiment of the invention.
Figure 5B:
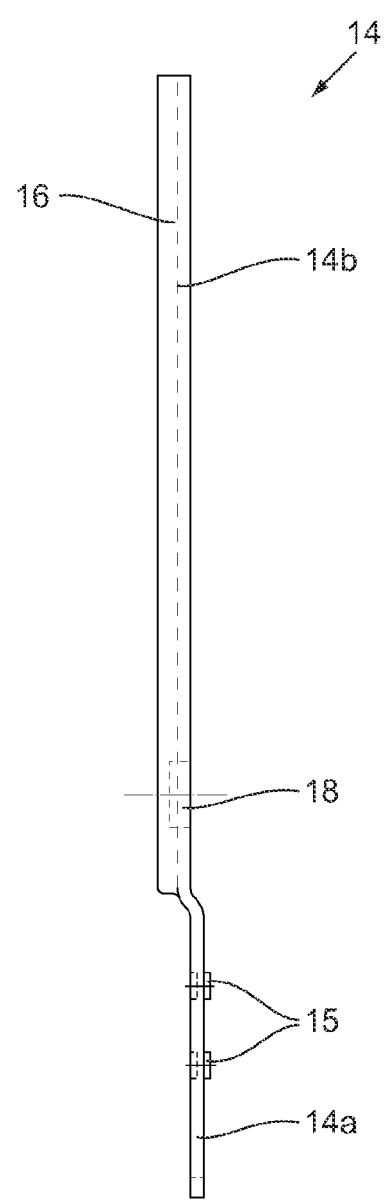

The wood chisel in accordance with the invention further comprises a sliding element 14 illustrated in FIGS. 5a and 5b and having the form of a substantially rectangular plate. The sliding element 14 comprises a first portion 14a preferably having two ridges 15 intended to facilitate handling of the sliding element 14 by the user. The end of this first portion 14a of the sliding element 14 has a cut-out 17 intended to co-operate with the finger 13c of the tab 13 of the locking element 10.

The second portion 14b of the sliding element 14 has lateral flanges 16 extending perpendicularly to the longitudinal axis of the sliding element on the side opposite the ridges 15. Still on the face opposite that having the ridges 15, the sliding element has a stop 18 intended to slide in the oblong opening 9 of the core 6.

The lateral flanges 16 of the sliding element 14 are shaped such that said sliding element 14 can be displaced in the first profiled part 1, said lateral flanges sliding between the bent edges 2 of the first profiled part 1 and the core 6.

The assembly and operation of the wood chisel in accordance with this second embodiment will now be described in detail. The core 6 is inserted into the first profiled part 1, its positioning being ensured by the insertion of the first protuberance 7 of the core 6 into the first hole 3 of the first profiled part 1. The locking element 10 is then inserted in the first profiled part 1. Said locking element is correctly positioned when the second protuberance 8 of the core 6 is correctly pushed into the third hole 12 of the locking element. Owing to the shape of the first profiled part 1, of the core 6 and of the locking element 10, the latter can be removed from the first profiled part 1 only by displacing it along the longitudinal axis of the first profiled part. In particular, said locking element cannot be removed from the first profiled part 1 vertically. Therefore, once in its operational position, the locking element 10 is pushed into the first profiled part 1 and also locks the core 6 in said first profiled part 1.

The size of the core 6 is such that once the first profiled part 1, the core 6 and the locking element 10 are in their operational position, the positioning holes 5 are not covered by the core and are accessible to the user, as illustrated in FIG. 8.

The sliding element 14 is inserted into the first profiled part 1 such that the lateral flanges 16 of said sliding element 14 enclose the core 6. Owing to the shape of the first profiled part 1 and of the sliding element 14, the latter cannot be removed from the first profiled part vertically. As was the case for the locking element 10, the sliding element 14 can only be displaced laterally along the longitudinal axis of the first profiled part 1.

Displacement of the sliding element 14 with respect to the first profiled part 1 is limited by the travel of the stop 18 in the oblong opening 9 of the core 6. Moreover, in the closed position, the finger 13c of the tab 13 of the locking element 10 co-operates with the cut-out 17 of the sliding element 14 to lock it and prevent it from sliding further forward with respect to the first profiled part 1. This closed position is illustrated in FIG. 7. The size of the sliding element 14 is such that in this closed position, the sliding element covers the positioning holes 5 of the first profiled part 1, these thus being inaccessible for the user.

In order to displace the sliding element 14 into its open position, the user must press the tab 13, via its circular portion 13a, so as to disengage the finger 13c from the cut-out 17. Whilst keeping pressure on the tab 13, the user can then slide the sliding element 14 over the locking element 10, thereby uncovering the positioning holes 5 of the first profiled part 1.

The travel of the sliding element 14 is limited by the stop 18 sliding in the oblong opening 9. The locking element 10 and the sliding element 14 are shaped such that the latter can slide over the former. This open position is illustrated in FIG. 8.

Figure 6A:
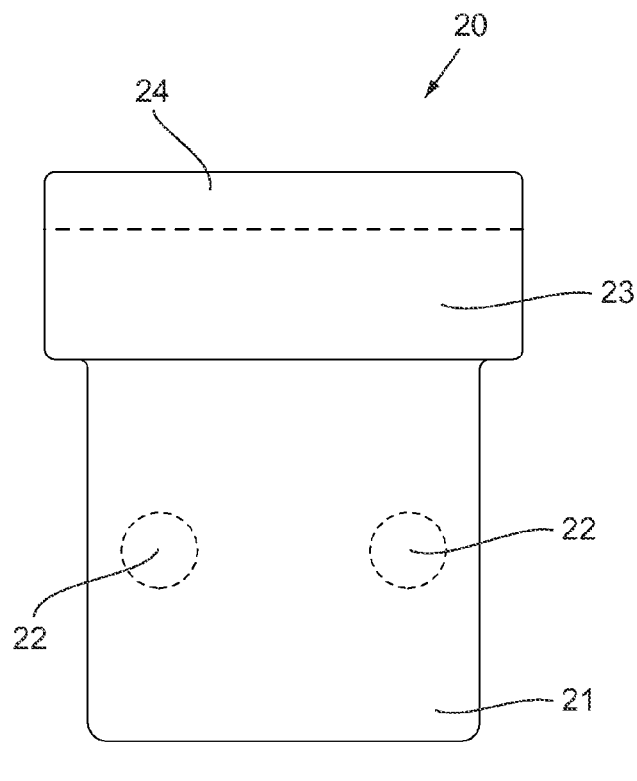
FIG. 6a illustrates the removable blade of a wood chisel in accordance with the second embodiment of the invention.
Figure 6B:
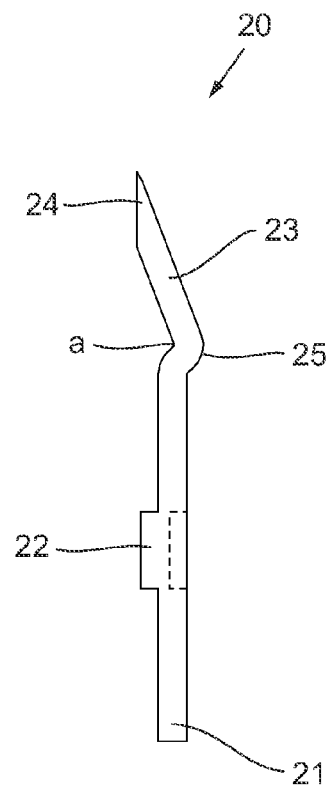

The wood chisel in accordance with the second embodiment of the invention further comprises a removable blade 20 illustrated in FIG. 6a. The removable blade 20 comprises a fixing plate 21 having retaining means having for example the form of first and second lugs 22 intended to co-operate with the positioning holes 5 of the first profiled part 1. The size and shape of the fixing plate are such that it can be inserted in the first profiled part 1 and between said profiled part 1 and the sliding element 14.

The removable blade 20 further comprises a cutting plate 23 fixedly attached to the fixing plate 21. The free end of the cutting plate 23 has a cutting edge 24. The size of the cutting plate and the angle of the cutting edge may vary depending upon the type of blade.

When the sliding element 14 is in the open position, the removable blade 20 is placed in the first profiled part 1. The suitable positioning of the blade 20 is ensured by the snap-fitting of the first and second lugs 22 in the positioning holes 5 of the first profiled part 1.

In order to ensure the fixing of the removable blade 20 to the wood chisel in accordance with the invention, the user must now displace the sliding element 14 into its closed position by sliding it with respect to the first profiled part 1. Once the sliding element is in its closed position, the fixing plate 21 of the removable blade 20 is completely covered by the sliding element 14 which thus keeps the removable blade 20 fixedly attached to the wood chisel in accordance with the invention.

The present embodiment has been described by way of example only. In particular, the tab 13 could be replaced by any suitable resilient force. Similarly, the various positioning means, such as the protuberances, the recesses, the stops, could be replaced by any other suitable positioning means.

The angle a between the cutting plate 23 and the fixing plate 21 of the removable blade may vary depending upon the type of blade. However, the cutting plate 23 is adjusted with respect to the fixing plate 21 so as to form a shoulder 25 shaped such that possible material shavings lifted off during use of the wood chisel in accordance with the invention cannot come to slide between the sliding element 14 and the removable blade 20. This variation for the removable blade can likewise be applied to a removable blade intended to be fitted to a wood chisel in accordance with the first embodiment. The cores 105, 6 described in the two embodiments described above are optional in both cases.

The invention claimed is:

1. A tool, comprising:
   a first profiled part (100; 1);
   a second profiled part (103; 10, 14) fitted into the first profiled part, the second profiled part being similar and complementary in shape to the first profiled part and is shaped to be inserted into the first profiled part; and
   a removable blade (106; 20) between said first and second profiled parts and held therein by friction generated between the removable blade and the first and second profiled parts,
   wherein the second profiled part (103; 10, 14) is fitted into the first profiled part in such a way that the removable blade is inserted between said first and second profiled parts (100; 1; 103; 10, 14), such that said removable blade is held therein by an interference fit caused by the friction generated between the removable blade and the first and second profiled parts.

2. The tool as claimed in claim 1, wherein the tool further comprises a core (105; 6) positioned between the first and second profiled parts (100; 1; 103; 10, 14).

3. The tool as claimed in claim 2, wherein the first and second profiled parts (100, 103) comprise an oblong opening (110) co-operating with a hole (111) produced in the removable blade (106) in order to enable said removable blade (106) to be removed from the first and second profiled parts (100, 103).

4. The tool as claimed in claim 2, wherein the second profiled part comprises a sliding element (14) which slides with respect to the first profiled part and can be displaced between a first open position in which the removable blade (20) can be placed on the first profiled part (1) and a closed position in which the removable blade (20) is held between the first profiled part (1) and the sliding element (14).

5. The tool as claimed in claim 4, wherein the second profiled part further comprises locking means (14) which can be operated by a user to lock the sliding element in its closed position.

6. The tool as claimed in claim 5, wherein the first profiled part comprises first retaining means (5) co-operating with second retaining means (22) provided on the removable blade (20) in order to position the removable blade (20) on the first profiled part when the sliding element (14) of the second profiled part is in its open position.

7. The tool as claimed in claim 1, wherein the first and second profiled parts (100, 103) comprise an oblong opening (110) co-operating with a hole (111) produced in the removable blade (106) in order to enable said removable blade (106) to be removed from the first and second profiled parts (100, 103).

8. The tool as claimed in claim 1, wherein the second profiled part comprises a sliding element (14) which slides with respect to the first profiled part and can be displaced between a first open position in which the removable blade (20) can be placed on the first profiled part (1) and a closed position in which the removable blade (20) is held between the first profiled part (1) and the sliding element (14).

9. The tool as claimed in claim 8, wherein the first profiled part comprises first retaining means (5) co-operating with second retaining means (22) provided on the removable blade (20) in order to position the removable blade (20) on the first profiled part when the sliding element (14) of the second profiled part is in its open position.

10. The tool as claimed in claim 8, wherein the second profiled part further comprises locking means (10) which can be operated by a user to lock the sliding element in its closed position.

11. The tool as claimed in claim 10, wherein the first profiled part comprises first retaining means (5) co-operating with second retaining means (22) provided on the removable blade (20) in order to position the removable blade (20) on the first profiled part when the sliding element (14) of the second profiled part is in its open position.

12. The tool according to claim 1, wherein the tool is a wood chisel.

* * * * *

UNITED STATES PATENT AND TRADEMARK OFFICE
CERTIFICATE OF CORRECTION

PATENT NO. : 8,869,404 B2
APPLICATION NO. : 13/071805
DATED : October 28, 2014
INVENTOR(S) : Francois Derivaz Page 1 of 1

It is certified that error appears in the above-identified patent and that said Letters Patent is hereby corrected as shown below:

On the title page, please amend Item (75) to read as follows:

-- (75) Inventor: Francois Derivaz, Chatel-St-Denis (CH) --

Signed and Sealed this
Third Day of February, 2015

Michelle K. Lee
*Deputy Director of the United States Patent and Trademark Office*